United States Patent
Yeganeh et al.

(10) Patent No.: US 10,745,626 B2
(45) Date of Patent: *Aug. 18, 2020

(54) DESALTER OPERATION

(71) Applicant: ExxonMobil Research and Engineering Company, Annandale, NJ (US)

(72) Inventors: Mohsen Shahmirzadi Yeganeh, Hillsborough, NJ (US); Daniel Patrick Cherney, Hampton, NJ (US); Robert P. Lucchesi, Flemington, NJ (US); Pawel L. Peczak, Basking Ridge, NJ (US); Yibing Zhang, Annandale, NJ (US); Richard W. Flynn, Elizabeth, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 311 days.

This patent is subject to a terminal disclaimer.

(21) Appl. No.: 14/556,398

(22) Filed: Dec. 1, 2014

(65) Prior Publication Data
US 2015/0175904 A1    Jun. 25, 2015

Related U.S. Application Data

(60) Provisional application No. 61/918,843, filed on Dec. 20, 2013.

(51) Int. Cl.
*C10G 32/02* (2006.01)
*C10G 31/08* (2006.01)
(Continued)

(52) U.S. Cl.
CPC .......... *C10G 32/02* (2013.01); *B01D 17/045* (2013.01); *B01D 17/06* (2013.01); *C10G 31/08* (2013.01);
(Continued)

(58) Field of Classification Search
CPC ........ C10G 33/02; C10G 33/04; B01D 17/06; C02F 1/463
See application file for complete search history.

(56) References Cited

U.S. PATENT DOCUMENTS 3,592,756 A * 7/1971 Jarvis ................ B01D 17/0208
204/662
4,200,550 A * 4/1980 Scherrer ................ C10G 31/08
516/141

(Continued)

OTHER PUBLICATIONS

PCT Application No. PCT/US2014/068260, Communication from the International Searching Authority, Forms PCT/ISA/220, PCT/ISA/210 and PCT/ISA/237, dated Feb. 19, 2015, 9 pages.

*Primary Examiner* — Brian W Cohen
(74) *Attorney, Agent, or Firm* — Glenn T. Barrett

(57) ABSTRACT

A petroleum desalting process in which the role played by the oil/bulk-resolved-water interface in the dehydration of the stabilized emulsion which forms in the desalter is recognized. The desalting process is improved by introducing the demulsifier and chemical high voltage electrodes. Water droplets in the mixture coalesce and settle towards the bottom of the vessel. A stabilized emulsion layer formed from the oil and the water with additives into the water phase and/or injecting chemical additives directly in the vicinity of the water/oil interface. This improved methodology that makes the rapid and effective delivery of chemical demulsifiers to the rag layer and/or oil/bulk-resolved-water interface possible. In operation, the desalting is carried out by mixing a crude oil to be desalted with water and passing the mixture of oil and water to the desalter vessel. The mixture enters the desalting vessel in the form of an emulsified mixture which is then separated by application of an electric field between emulsion-stabilizing solids from the oil forms above the interface between the denser water layer and the (Continued)

Figure 1:
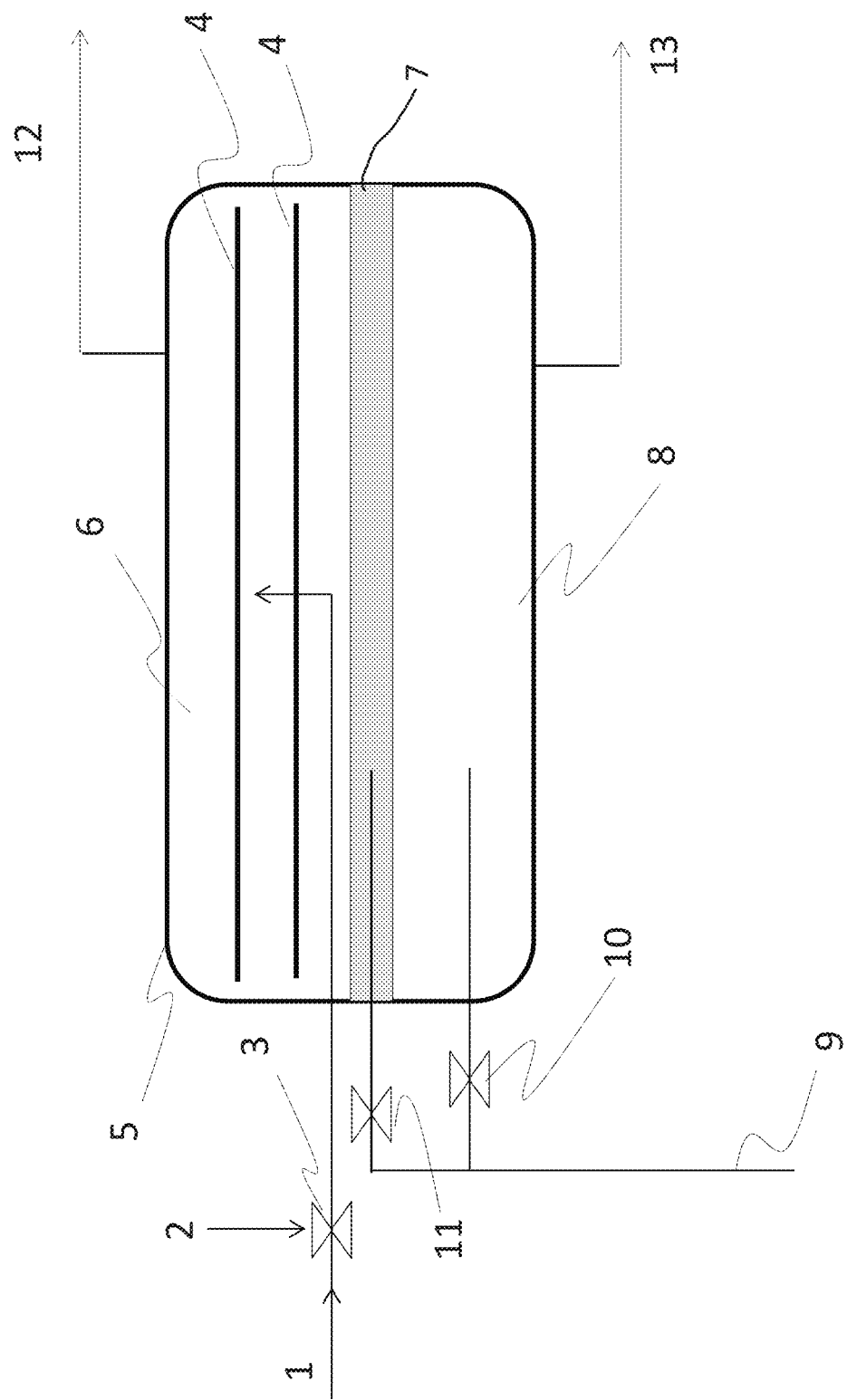

supernatant oil layer. A chemical demulsifier is added to the water layer in the region of the stabilized emulsion layer and/or directly into the emulsion layer itself. The separated water is removed as effluent through a water outlet at the bottom of the vessel and desalted oil is removed from the oil layer through an oil outlet at the top of the vessel.

3 Claims, 6 Drawing Sheets

(51) Int. Cl.
    *C10G 33/04*     (2006.01)
    *B01D 17/06*     (2006.01)
    *B01D 17/04*     (2006.01)
    *C10G 33/02*     (2006.01)
    *C02F 1/463*     (2006.01)

(52) U.S. Cl.
    CPC ............. *C10G 33/02* (2013.01); *C10G 33/04* (2013.01); *C02F 1/463* (2013.01)

(56) References Cited

U.S. PATENT DOCUMENTS

| | | | |
|---|---|---|---|
| 4,722,781 A * | 2/1988 | Swartz | C10G 31/08 208/177 |
| 5,219,471 A | 6/1993 | Goyal et al. | |
| 5,746,908 A | 5/1998 | Mitchell | |
| 7,867,382 B2 | 1/2011 | Droughton | |
| 7,923,418 B2 | 4/2011 | Becker | |
| 7,981,979 B2 | 7/2011 | Flatt | |
| 2003/0217971 A1 | 11/2003 | Varadaraj et al. | |

* cited by examiner

DESALTER OPERATION

CROSS-REFERENCE TO RELATED APPLICATIONS

This application claims priority to U.S. Provisional Application Ser. No. 61/918,843 filed Dec. 20, 2013, herein incorporated by reference in its entirety.

FIELD OF THE INVENTION

This invention relates to the operation of petroleum desalters and in particular to an improved method of adding demulsifiers to the desalting process.

BACKGROUND OF THE INVENTION

Crude petroleum normally contains salts that may corrode refinery units; salt is removed from the crude oil by a process known as "desalting", in which hot crude oil is mixed with water and a suitable demulsifying agent to form a water-in-oil emulsion which provides intimate contact between the oil and water, transferring salt into the water. The salty emulsion is then passed into a high voltage electric field inside a closed separator vessel. The electric field forces water droplets to coalesce, forming larger water droplets. As the water droplet volumes increase, they settle to the bottom of the tank under gravitation. The desalted oil forms at the upper layer in the desalter from where it is continuously drawn off for distillation. The salty water is withdrawn from the bottom of the desalter.

During operation of desalter units, a stable emulsion phase (also known as a "rag layer") of variable composition and thickness forms above the interface between the oil—and the separated bulk water phase at the bottom of the desalter. This interface will be referred to here as "oil/bulk-resolved-water interface". The formation of a rag layer is mostly due to stability of the oil/bulk-resolved-water interface caused by natural surfactants (e.g. asphaltene, naphthenic acid) and/or solids. Particularly, solids can reside at the interface generating a physical barrier against the immersion of water droplets into the bulk water phase at the bottom of the desalter. Rag layer formation is especially problematic for crude with high amount of natural surfactants and/or solids. The growth of rag layer reduces workable volume and may short the electric circuit and force unplanned and costly desalter shut down.

Additionally, processing crudes with high rag layer formation tendencies in current desalter configurations may cause poor desalting (salt removal) efficiency due to solids build up at the bottom of the vessel, and/or a solids-stabilized rag layer leading to erratic level control and insufficient residence time for proper water/oil separation. Formation of the rag layer has become a major desalter operating concern, generating desalter upsets, increased preheat train fouling, and deteriorating quality of the brine effluent and disruption of the operation of the downstream wastewater treatment facilities.

The water content of the rag layer may range from 20 to 95% water with the balance being hydrocarbon (normally full range crude oil) and up to 5 weight percent inorganic solids. Precipitated asphaltenes, waxes, and paraffins may also be found at elevated levels in the rag layer (compared to the incoming crude oil) which combine with particulates (solids), to bind the mixture together to form a complex structure that is highly stable. Intractable emulsions of this kind comprising oil, water and solids make adequate separation and oil recovery difficult. Often, these stable emulsions arising from the desalter are periodically discarded as slop streams. This results in expensive treating or handling procedures or pollution problems as well as the fact that crude oil is also lost with these emulsions and slop streams.

Refinery sites which process high solids-content crudes have the most pervasive problems with emulsion formation. Heavy crude oils and bitumens from Western Canada which contain elevated levels of small clay fines and other small solids are particularly prone to forming large volumes of highly stable emulsion and with such feeds, growth of the rag layer is more prevalent. These feeds are, however, being introduced to refineries in greater quantities despite two main disadvantages related to the efficacy of desalting. First, the viscosity of these crudes can be quite high, so transport of water through the feed is slower than in high API gravity crude. Second, the density mismatch between water and oil is lower, so the gravitational energy gradient is reduced compared to higher API gravity crudes. Growth of the rag layer in the desalter requires either the amount of crude passed through the desalter is reduced or removal of the rag layer from the desalting vessel for external treatment.

Attempts to mitigate the effects of rag layer formation are normally carried out by withdrawal of the emulsion from the unit or by the addition of chemical demulsifiers upstream of a desalter. The use of the demulsifier has proven to be effective in reducing emulsion stability between electrodes in a desalter, but may not be effective in reducing the rag layer build-up which is mainly due to stability of the oil/bulk-resolved-water interface. The common practice for application of demulsifiers has been to add the chemical demulsifiers to the water, oil, or the emulsion before introducing the oil/water mixture to the electric field, as shown by the following references.

U.S. Pat. No. 5,746,908 (Mitchell/Phillips Petroleum), discloses the use of steam to make emulsion and adding demulsifier to the mixture.

U.S. Pat. No. 7,867,382 (Droughton) discloses the use of demulsifier and mesoporous materials for reducing water-in-oil emulsion stability.

U.S. Pat. No. 7,923,418 (Becker/Baker Hughes) discloses the use of acrylate polymer emulsion breakers for reducing stability of a water-in-oil emulsion.

U.S. Pat. No. 7,981,979 (Flatt/Nalco) discloses the use of siloxane cross-linked demulsifiers for reducing water-in-oil emulsion stability.

A shortcoming of the current practice is due, in part, to the inability of chemical demulsifiers to reach high enough concentrations at the oil/bulk-resolved-water interface, particularly at the beginning of the desalter operation. Accordingly, the need persists for more effective techniques for mitigating the effects of rag layer formation.

SUMMARY OF THE INVENTION

The current invention recognizes the role played by the oil/bulk-resolved-water interface in dehydration and introduces the demulsifier and chemical additives in to the water phase and/or injecting chemical additives directly in the vicinity of the water/oil interface. This improved methodology makes the rapid and effective delivery of chemical demulsifiers to the rag layer and especially to the oil/bulk-resolved-water interface possible. The method is shown to be far more effective in enhancing dehydration of the oil and in reducing oil/bulk-resolved-water interface stability, as compared to demulsifier injection only at upstream of the desalter vessel. In addition, direct delivery of the chemical additives to the interface substantially reduces the overall amount of chemical additives needed and the dehydration rate may also be increased.

In operation, the desalting is carried out by mixing a crude oil to be desalted with water and passing the mixture of oil and water to the desalter vessel. The mixture enters the desalting vessel in the form of an emulsified oil/water mixture which is then separated by application of an electric field between high voltage electrodes. Water droplets in the emulsified mixture coalesce in the electric field and settle towards the bottom of the tank under gravitational forces. The electrocoalesced water droplet must break the skin between oil and bulk-resolved-water before immersing into the water phase at the bottom of a desalter. The oil/bulk-resolved-water interface can be highly stable due to crude natural surfactants and/or solids. A stable oil/bulk-resolved-water interface prevents droplets from becoming immersed in the water phase so causing rag layer formation. A stabilized emulsion layer formed from the oil and the water and emulsion-stabilizing solids forms above the interface between the denser, settled water layer and the supernatant oil layer. According to the present invention, a chemical demulsifier is used to destabilize the emulsion and the oil/bulk-resolved-water interface by adding the demulsifier to the water layer in the region of the stabilized emulsion and/or directly into the stabilized emulsion layer. The separated water is removed as effluent through a water outlet at the bottom of the vessel and desalted oil is removed from the oil layer through an oil outlet at the top of the vessel.

DRAWINGS

In the accompanying drawings:

FIG. 1 is a simplified schematic of a crude petroleum desalter unit, and

FIGS. 2 to 6 of are graphs showing the results of the experiments reported in Examples 1 to 5 below.

DETAILED DESCRIPTION

Petroleum Crude Desalting

Desalting is one of the first steps in crude refining. It is done to remove salts and particulates to reduce corrosion, fouling and catalyst poisoning. In a typical desalting process, fresh water (also referred to as wash water) is mixed with oil to produce a water-in-oil emulsion, which in turn extracts salt, brine and some particulates from the oil. The salty emulsion is then sent to a desalter unit where the application of an electric field forces water droplets to coalesce. Large electrocoalesced water droplets settle under gravity and penetrate through the oil/bulk-resolved-water interface to immerse into the resolved bulk water phase at the bottom of the desalter. The desalted oil and the resolved bulk water are then removed at the top and the bottom of a desalter, respectively.

The wash water used to treat the crude oil may be derived from various sources and the water itself may be, for example, recycled refinery water, recirculated wastewater, clarified water, purified wastewater, sour water stripper bottoms, overhead condensate, boiler feed water, clarified river water or from other water sources or combinations of water sources. Salts in water are measured in parts per thousand by weight (ppt) and could range from fresh water (<0.5 ppt), brackish water (0.5-30 ppt), saline water (30-50 ppt) to brine (over 50 ppt). Although deionized water may be used to favor exchange of salt from the crude into the aqueous solution, de-ionized water is not normally required to desalt crude oil feedstocks although it may be mixed with recirculated water from the desalter to achieve a specific ionic content in either the water before emulsification or to achieve a specific ionic strength in the final emulsified product. Wash water rates may be between approximately 5% and approximately 7% by volume of the total crude charge, but may be higher or lower dependent upon the crude oil source and quality. Frequently, a variety of water sources are mixed as determined by cost requirements, supply, salt content of the water, salt content of the crude, and other factors specific to the desalting conditions such as the size of the separator and the degree of desalting required.

Challenged crudes (i.e. crude with a high amount of particulates and/or natural emulsifiers) have been shown to produce a substantial amount of stable emulsion layers (a.k.a. rag layer), accumulating above the interface between the oil and resolved bulk water. The existence of a rag layer is mostly due to the inability of electrocoalesced droplets to break the oil/bulk-resolved-water interface.

The rag layer in the desalter typically contains a high concentration of oil, residual water, suspended solids and salts which, in a typical example, might be approximately 70% v/v water, 30% v/v oil, with 5000-8000 pounds per thousand barrels (PTB) (about 14 to 23 g/l) solids, and 200-400 PTB (about 570 to 1100 mg/l) salts. The aqueous phase contains salts from the crude oil. Crudes with high solids contents present a particularly intractable problem since the presence of the solids, often with particle sizes under 5 microns, may act to stabilize the emulsion and the oil/bulk-resolved-water interface, leading to a progressive increase in the depth of the rag layer. The present invention is especially useful in its application to challenged crudes containing high levels of solids and it may also be applied to benefit the desalting of high asphaltene content crudes which also tend to stabilize the emulsion layer and the oil/bulk-resolved-water interface in a desalter.

The conventional mitigation strategies carried out by enhancing the electrocoalescence in the desalter by, for example, the upstream addition of chemical demulsifiers tend to be less than totally effective in reducing the stability of the oil/bulk-resolved-water interface. This is likely due to the inability of the additive to fully reach the oil/bulk-resolved-water interface at the beginning of the desalting operation.

Thinning of the oil film between electrocoalesced water droplets and the resolved bulk water phase is mainly due to the gravitational force. A slow rate of film thinning reduces the ability of electrocoalesced water droplets to immerse into the resolved bulk water phase, causing the growth of a rag layer. The rate of film thinning strongly depends on the particulates and the chemistry of the oil at that interface and it may depend on physical parameters different from those of the electrocoalescence mechanism. The mechanism of emulsion stability within the electrodes, therefore, may not be the same as that of the stability of the oil/bulk-resolved-water interface. This in turn demands the different additive treatment for the oil/bulk-resolved-water interface which is provided in the present desalting process.

FIG. 1 shows a much simplified schematic of a crude petroleum desalter unit utilizing the option of direct injection of the demulsifier into the emulsion layer. The incoming crude oil feed to be desalted enters by way of line 1 and is mixed with fresh wash water feed from line 2 in mixing valve 3 to emulsify the water into the oil before the mixture is introduced into the desalter vessel 5. Under the high voltage electric field induced by means of electrode grids 4, the separation of the oil phase 6 and the water phase 8 takes place with the emulsion phase (rag layer) 7 forming at the interface between the oil and water phases. Demulsifier is injected directly into the emulsion layer or water phase by way of line 9 and valves 10 and 11. Desalted oil is withdrawn from an outlet in the upper portion of the vessel and passes to refinery processing in line 12; salty water (brine) containing salts washed out of the crude is withdrawn from an outlet at the bottom of the vessel through line 13 and sent to waste water recovery.

An alternative to injection of the demulsifier into the emulsion layer itself is to inject the demulsifier into the aqueous phase (resolved bulk water phase) in the immediate zone of the emulsion layer, preferably within about 20 cm and more preferably within about 10 cm of the oil/water interface.

To accommodate growth and movement of the emulsion layer in the vessel, the emulsifier inlet line may be provided with a manifold with inlet ports at different vertically spaced levels permitting the emulsifier to be injected into the emulsion at one or more of the ports as required. The ports may be provided with manually or, more preferably, automatic, operated valves to control the injection of the demulsifier.

Addition of demulsifier into the resolved bulk water phase and/or rag layer can also be combined with addition of other demulsifiers upstream of the desalter.

Conventional types of demulsifier commonly used in the processing of crude oil are useful in the present process although the process is not focused upon the particular selection of demulsifier. Among the demulsifiers which may be used are those typically based on the following chemistries: polyethyleneimines, polyamines, polyols, ethoxylated alcohol sulfates, long chain alcohol ethoxylates, long chain alkyl sulfate salts, e.g. sodium salts of lauryl sulfates, epoxies, di-epoxies (which may be ethoxylated and/or propoxylated). A useful class of polyamines comprises the succinated polyamines prepared by the succination of polyamines/polyamine/imines with a long chain alkyl substituted maleic anhydride.

Example 1

PIBSA-PAM demulsifier added in emulsion, does not have a strong effect on emulsion stability under an E-field The water-in-oil emulsion stability under an electric field was evaluated in an experiment in which the time needed for water droplets to coalesce and produce a stream of water between two electrodes under a fixed applied electric field is measured. A shift of the time vs. E-field curve to the right of the graph is an indication of higher emulsion stability under the applied electric field.

Figure 2:
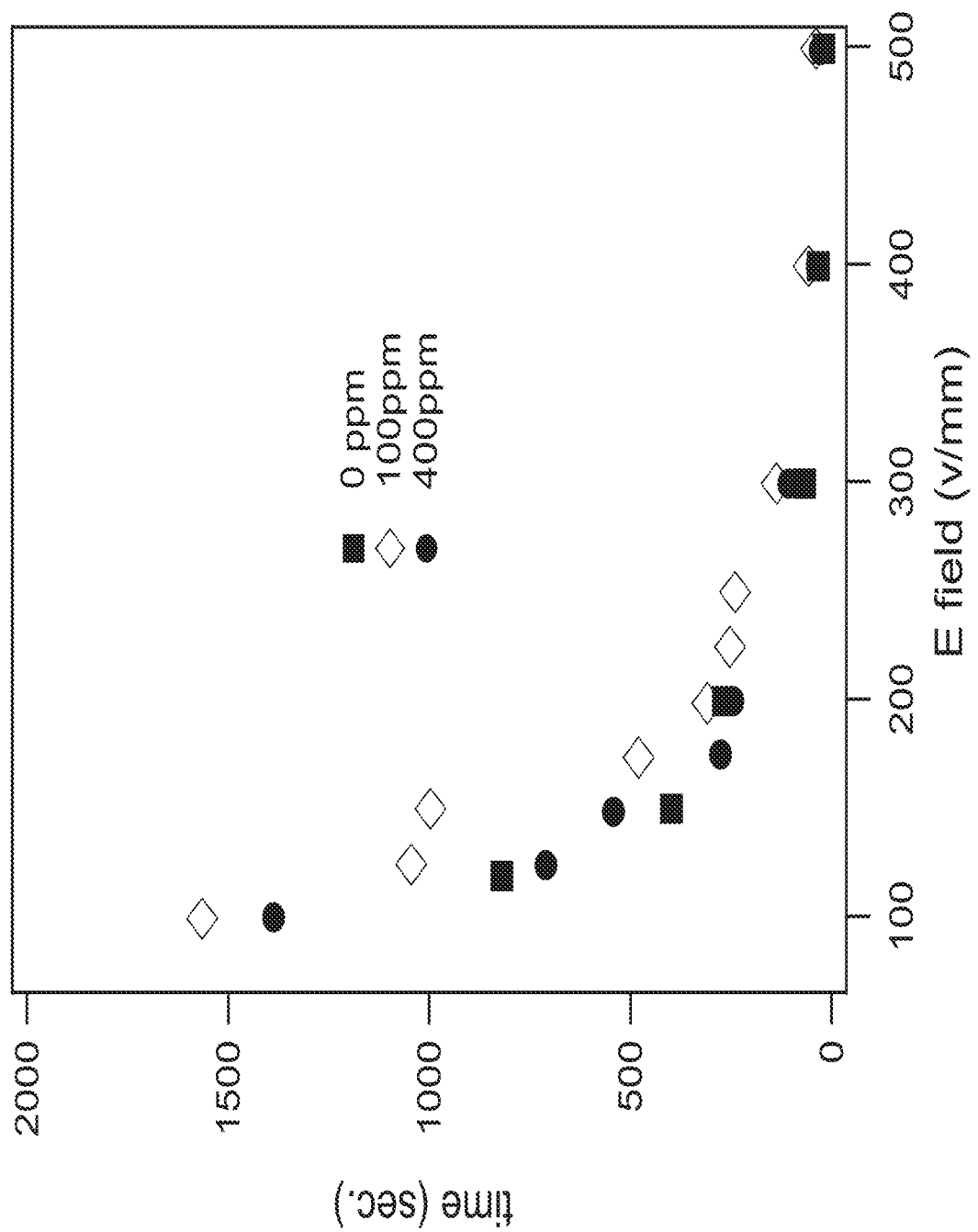

24 mL of a crude oil identified as crude A was mixed with 1 mL of water in a Waring™ blender for 10 seconds at half full power to produce a water-in-oil emulsion. The emulsion was put in the test apparatus and the time shift vs. E-field data points were recorded. The result is shown in FIG. 2, labeled "0 ppm".

In another experiment, 100 ppm of polyisobutylene succinic anhydride polyamine (PIBSA-PAM) demulsifier was added to 24 mL of crude A and mixed well. The mixture was mixed with 1 mL of water in a Waring blender for 10 seconds at half full power to produce a water-in-oil emulsion. The emulsion was put in the test apparatus and the time shift vs. E-field data points were recorded. The result is shown in FIG. 2, labeled "100 ppm."

In another experiment, 400 ppm of the polyisobutylene succinic anhydride polyamine (PIBSA-PAM) demulsifier was added to 24 mL of crude A and mixed well. The mixture was then mixed with 1 mL of water in a Waring blender for 10 seconds at half full power to produce a water-in-oil emulsion. The said emulsion was put in the test apparatus and the time shift vs. E-field data points were recorded. The result is shown in FIG. 2, labeled "400 ppm."

The results indicate that the PIBSA-PAM demulsifier does not have a strong effect on emulsion stability under an E-field.

Example 2

In the absence of a chemical demulsifier no water separates from the oil

Water and crude oil samples were heated to 85° C. 4 mL of the preheated water were added to 90 mL of preheated crude oil and blended for 10 seconds at half full power using a Waring blender to generate a water-in-oil emulsion. 74.5 mL of the emulsion was then poured in a transparent vessel of an Electrostatic Dehydration and Precipitation Tester (EDPT) (from Inter AV Inc., San Antonio, Tex.) which was preheated to 90° C. and contained 0.5 mL water. The vessel's cap was tightened and temperature was then increased to 120° C.

Voltages of 500, 1500 and 3000 volts for durations of one minute each were applied respectively at 10, 21, 33 minutes after the EDPT reached 120° C., respectively. A voltage of 3000 volts for duration of one minute was applied at 44, 55, and 66 minutes after the EDPT reached 120° C. The amount of the effluent water at the bottom of the vessel was measured at 5, 16, 27, 39, 50, 61 and 72 minutes after the EDPT reached 120° C. This includes both the water separated from the crude and the initial 0.5 mL added water.

Figure 3:
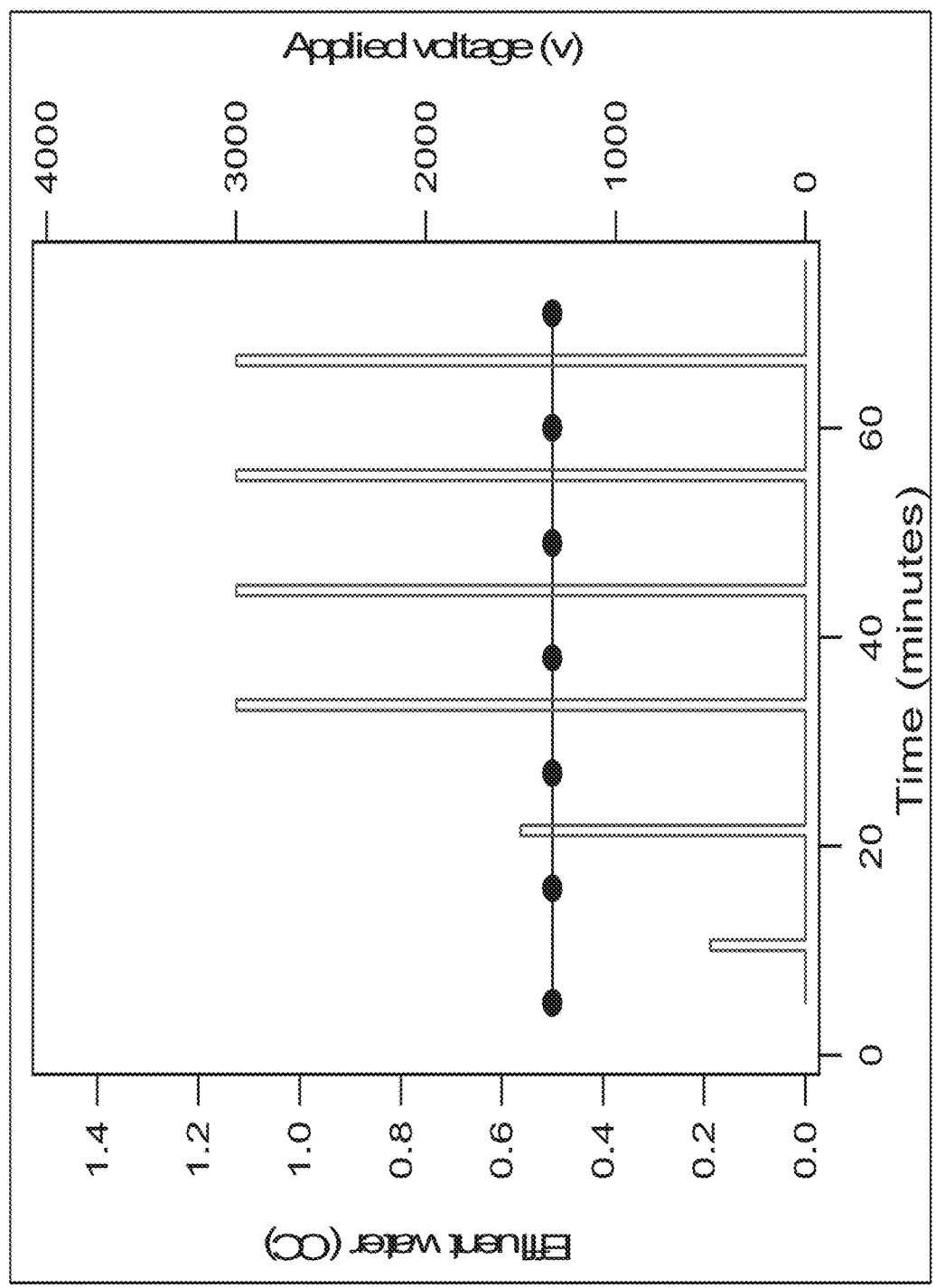

The variations in the amount of the effluent water with time and voltage are shown in FIG. 3. The maximum amount of water Observed was 0.5 mL. This indicates that in the absence of a chemical demulsifier no water separated from the oil and reached the bottom of the vessel.

Example 3

PIBSA-PAM demulsifier in effluent water reduces effluent water/oil interface stability Water and crude oil were heated to 85° C. 4 mL of the preheated water was then added to the mixture and blended for 10 seconds at half full power using a Waring blender to generate a water-in-oil emulsion. 74.5 mL of the emulsion was then poured in a transparent vessel of an EDPT which was preheated to 90° C. and contained 0.5 mL water and 100 ppm (with respect to total) of a polyisobutylene succinic anhydride polyamine (PIBSA-PAM) demulsifier. The vessel cap was tightened and temperature was then increased to 120° C.

Voltages of 500, 1500 and 3000 volts for durations of one minute each were applied respectively at 10, 21, 33 minutes after the EDPT reached 120° C., respectively. A voltage of 3000 volts for durations of one minute each was applied at 44, 55, and 66 minutes after the EDPT reached 120° C. The amount of the effluent water at the bottom of the vessel was measured at 5, 16, 27, 39, 50, 61 and 72 minutes after the EDPT reached 120° C. This includes both the water separated from the crude and the initial 0.5 mL added water.

Figure 4:
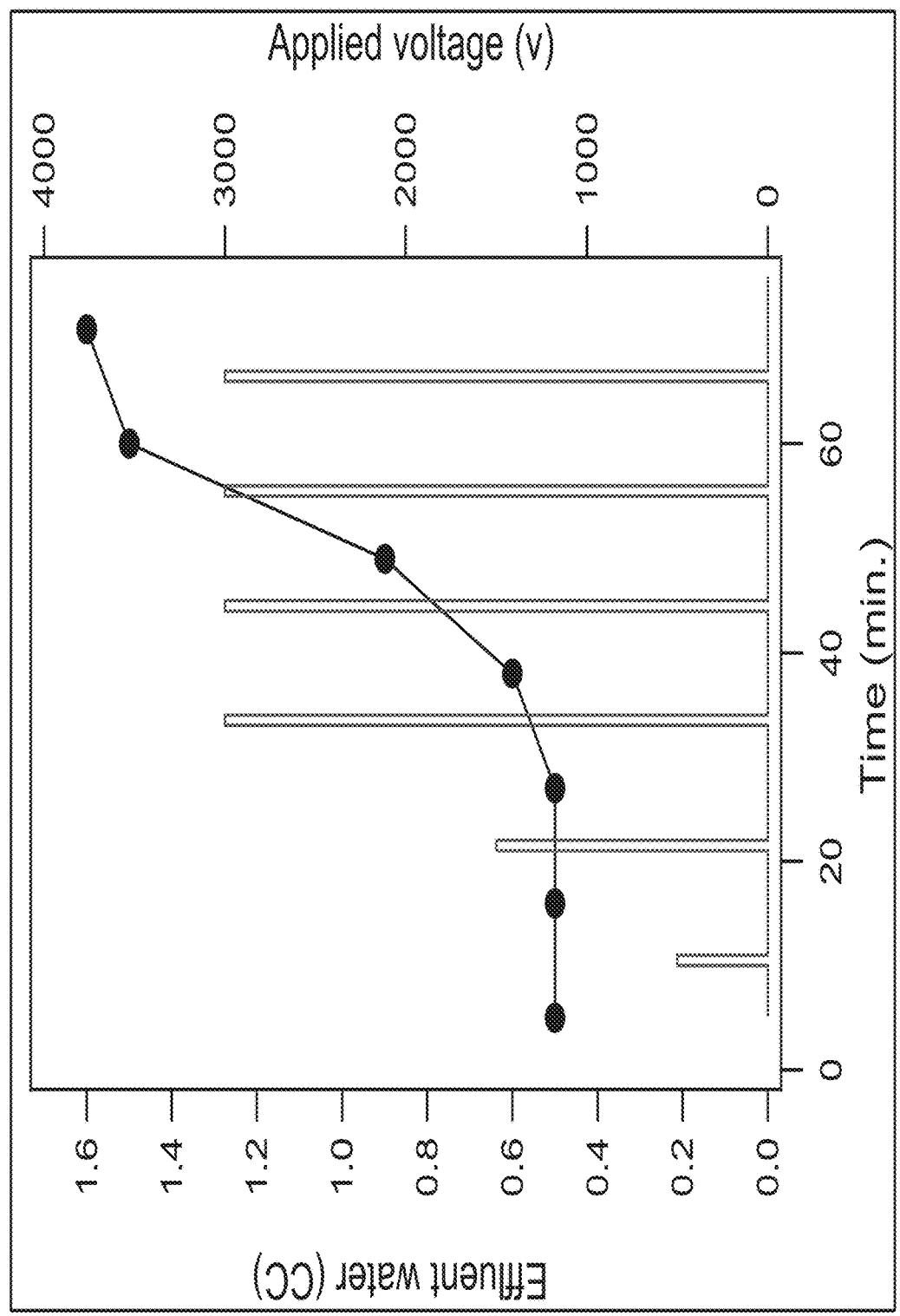

The variations in the amount of the effluent water with time and voltage are shown in FIG. 4. The maximum amount of water observed was 1.6 mL. This indicates that the maximum amount of water which was separated from the oil and reached the bottom of the vessel was 1.1 mL. This also indicates that PIBSA-PAM demulsifier is effective in removing water when added directly to the emulsion.

As Example 1 demonstrates that the demulsifier is not effective in reducing emulsion stability under an E-field, the effect of the demulsifier is seen to be one of reducing the stability between the oil/bulk-resolved-water interface, making the immersion of the electrocoalesced water droplets into the water phase possible.

Example 4

Super wetting agent added in the emulsion

Water and crude oil were heated to 85° C. 20 microlitres of super wetting agent (ethoxylated-trisiloxane type from Dow Corning) was added to 90 mL of the preheated crude oil and mixed well. 4 mL of the preheated water was then added to the mixture and blended for 10 seconds at half full power using a Waring blender to generate a water-in-oil emulsion. 74.5 mL of the emulsion was then poured in a transparent vessel of an EDPT which was preheated to 90° C. and contained 0.5 mL water. The vessel's cap was tightened and temperature was then increased to 120° C.

Voltages of 500, 1500 and 3000 volts for durations of one minute each were applied respectively at 10, 21, 33 minutes after the EDPT reached 120° C., respectively. A voltage of 3000 volts for duration of one minute was applied at 44, 55 and 66 minutes after the EDPT reached 120° C. The amount of the effluent water at the bottom of the vessel was measured at 5, 16, 27, 39, 50, 61 and 72 minutes after the EDPT reached 120° C. This includes both the water separated from the crude and the initial 0.5 mL added water.

Figure 5:
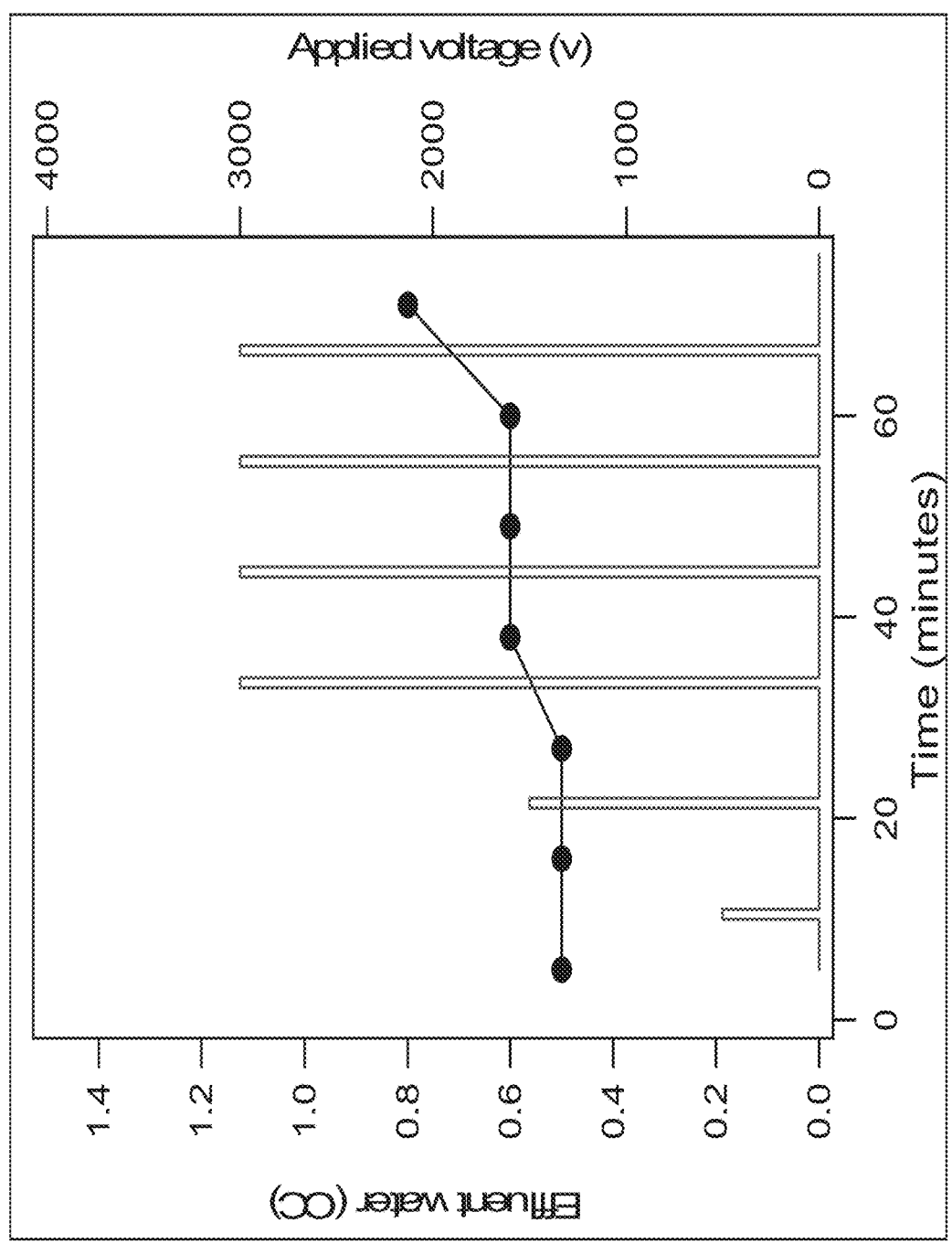

The variations in the amount of the effluent water with time and voltage are shown in FIG. 5. The maximum amount of water observed was 0.8 mL. This indicates that the maximum amount of water which separated from the oil and reached the bottom of the vessel was only 0.1 mL at 61 minutes and 0.3 mL after 72 minutes.

Example 5

Super wetting agent added to the aqueous phase reduces water/oil interface stability and removes coalesced water effectively Water and crude oil were heated to 85° C. 4 mL of the preheated water was then added to the oil and blended for 10 seconds at half full power using a Waring™ blender to generate a water-in-oil emulsion. 74.5 mL of the emulsion was then poured in a transparent vessel of an EDPT which was preheated to 90° C. and which contained 0.5 mL water and 20 microlitres of super wetting agent. The vessel's cap was tightened and temperature was then increased to 120° C.

Voltages of 500, 1500 and 3000 volts for durations of one minute each were applied respectively at 10, 21, 33 minutes after the EDPT reached 120° C. A voltage of 3000 volts for duration of one minute was applied at 44, 55, and 66 minutes after the EDPT reached 120° C. The amount of the effluent water at the bottom of the vessel was measured at 5, 16, 27, 39, 50, 61 and 72 minutes after the EDPT reached 120° C. This includes both the water separated from the crude and the initial 0.5 mL added water.

Figure 6:
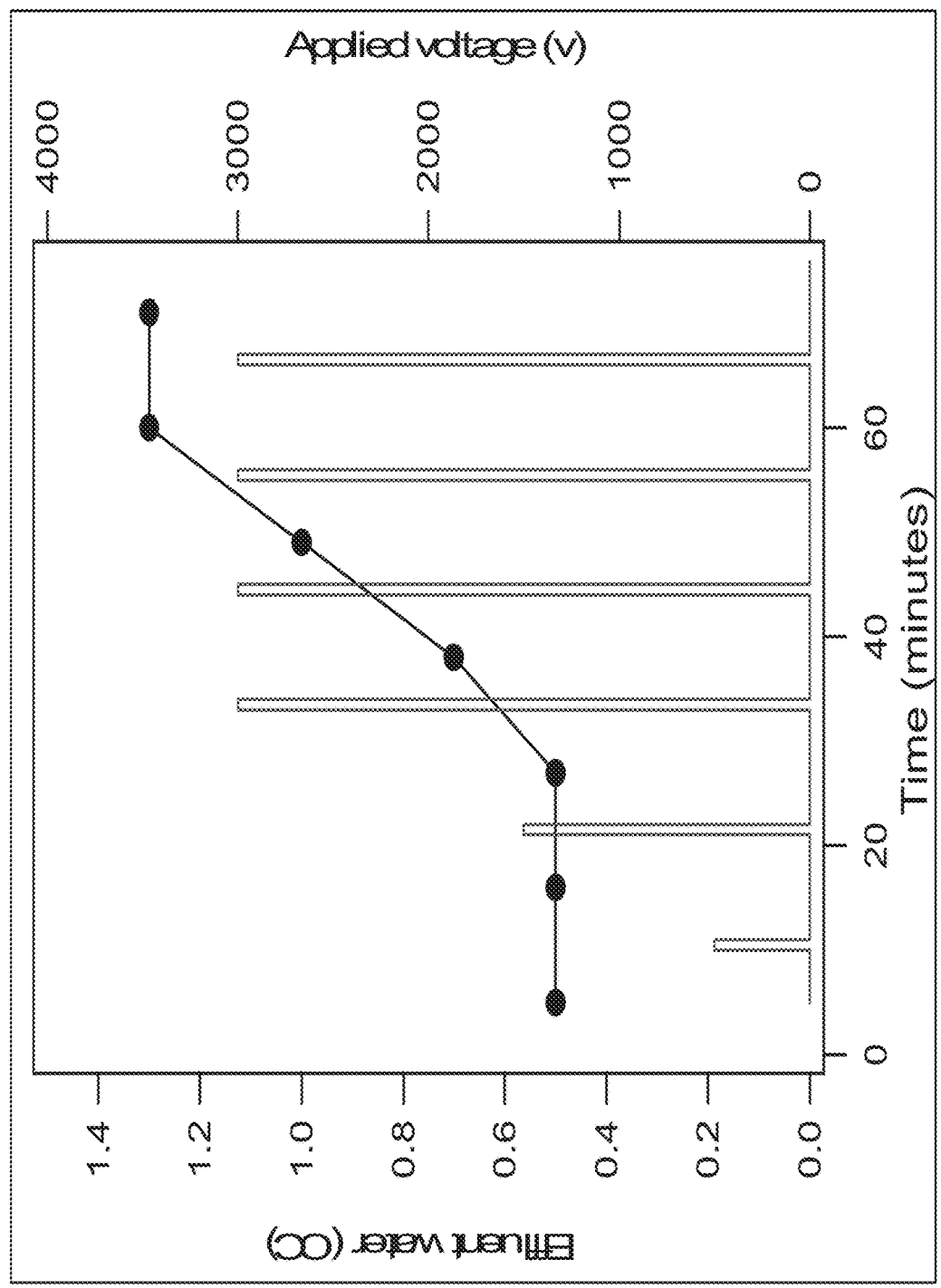

The variations in the amount of the separated water with time and voltage are shown in FIG. 6. The maximum amount of water Observed was 1.3 mL. This indicates that the maximum amount of water which separated from the oil and reached the bottom of the vessel was 0.8 mL—an increase of 166% water separation as compared to Example 4 where the additive was added to the oil. This increase reaches 700% at the 61 minute observation time.

Results from Examples 1, 3, and 5 indicate that the addition of the chemical demulsifier to the water not only enhances the extent but also increases the rate of the dehydration process.

ADDITIONAL EMBODIMENTS

Embodiment 1

In a petroleum desalting process which comprises mixing a crude oil with water and passing the mixture of oil and water in the form of an emulsified oil/water mixture to a desalter vessel in which the emulsified oil/water mixture is subjected to an electric field to cause separation of the mixture into a denser water layer containing dissolved salts and a supernatant oil layer with the formation of a stabilized emulsion layer between the oil layer and the separated water layer, and removing the separated oil and water layers, the improvement comprising adding a demulsifier to the water layer or directly into the stabilized emulsion layer to destabilize the emulsion.

Embodiment 2

A petroleum desalting process which comprises: mixing a crude oil to be desalted with water to form an oil/water emulsion, passing the emulsified mixture of oil and water to a desalter vessel, subjecting the emulsified mixture of oil and water in the desalter vessel to an electric field to cause separation of the emulsified oil/water mixture into a settled, denser water layer containing dissolved salts from the oil and a supernatant oil layer by coalescence of water droplets in the emulsified oil/water mixture with formation of a stabilized emulsion layer formed from the oil and the water and emulsion-stabilizing solids above the interface between the settled water layer and the supernatant oil layer, adding a demulsifier to the settled water layer in the region of the stabilized emulsion to destabilize the stabilized emulsion, separately removing the separated oil and water layers.

Embodiment 3

A desalting process according to Embodiment 1 or Embodiment 2 in which the demulsifier is added to the settled water layer within a vertical distance of not more than 20 cm from the interface between the oil and water layers.

Embodiment 4

A desalting process according to Embodiment 3 in which the demulsifier is added to the settled water layer within a vertical distance of not more than 10 cm from the interface between the oil and water layers.

Embodiment 5

A petroleum desalting process which comprises: mixing a crude oil to be desalted with water to form an oil/water emulsion, passing the emulsified mixture of oil and water to a desalter vessel, subjecting the emulsified mixture of oil and water in the desalter vessel to an electric field to cause separation of the emulsified oil/water mixture into a settled, denser water layer containing dissolved salts from the oil and a supernatant oil layer by coalescence of water droplets in the emulsified oil/water mixture with formation of a stabilized emulsion layer formed from the oil and the water and emulsion-stabilizing solids above the interface between the settled water layer and the supernatant oil layer, adding a demulsifier to the stabilized emulsion to destabilize the stabilized emulsion, separately removing the separated oil and water layers, water as effluent through a water outlet at the bottom of the vessel and desalted oil is removed from the oil layer through an oil outlet at the top of the vessel and/or directly into the stabilized emulsion layer.

Embodiment 6

A desalting process according to any of the preceding Embodiments in which demulsifier is also added to the crude at the upstream of a desalter.

The invention claimed is:

1. A petroleum desalting process which comprises:
mixing a crude oil to be desalted with water to form an oil/water emulsion,
passing the emulsified mixture of oil and water to a desalter vessel through an emulsified mixture supply line,
subjecting the emulsified mixture of oil and water in the desalter vessel to an electric field to cause separation of the emulsified oil/water mixture into a denser separated water layer containing dissolved salts from the oil and a supernatant oil layer by coalescence of water droplets in the emulsified oil/water mixture with formation of a stabilized emulsion layer formed from the oil and the water and emulsion-stabilizing solids between the separated water layer and the supernatant oil layer,
adding a demulsifier through a demulsifier supply line directly and only into the separated water layer within the desalter vessel in which the demulsifier is added to the separated water layer within a vertical distance of not more than 20 cm from the interface between the stabilized emulsion layer and the separated water layer to destabilize the stabilized emulsion, wherein the demulsifier supply line is separate from the emulsified mixture supply line, and
separately removing the separated oil and water layers.

2. A desalting process according to claim 1 in which the demulsifier is added to the separated water layer within a vertical distance of not more than 10 cm from the interface between the stabilized emulsion layer and the separated water layer.

3. A desalting process according to claim 1 further comprising adding an additional quantity of demulsifier to the crude oil at a location that is upstream of the desalter vessel.

* * * * *